UNITED STATES PATENT OFFICE.

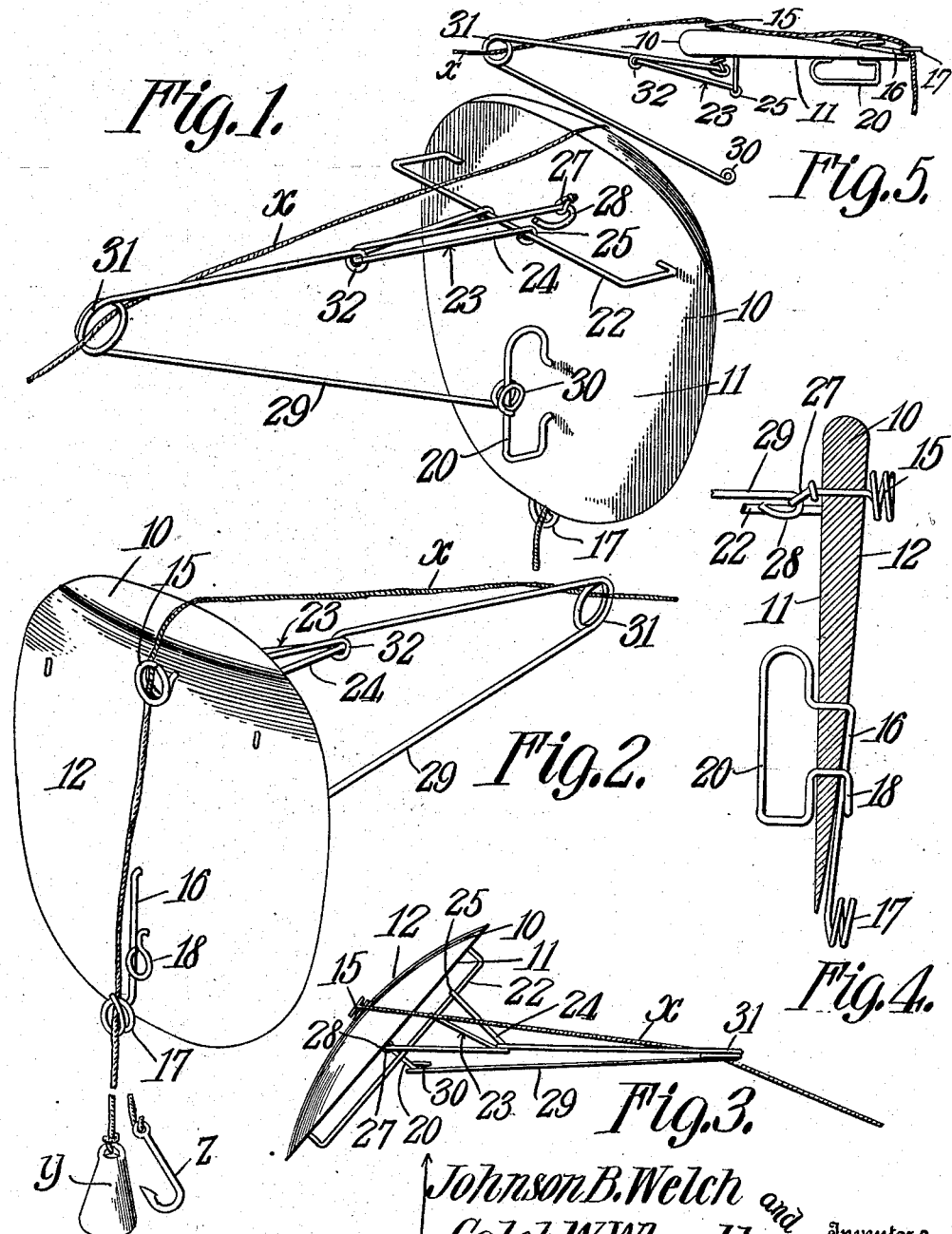

JOHNSON B. WELCH AND CALEB W. WHEATLEY, OF STOCKPORT, IOWA.

FISHING DEVICE.

No. 900,139.      Specification of Letters Patent.      Patented Oct. 6, 1908.

Application filed December 30, 1907. Serial No. 408,692.

*To all whom it may concern:*

Be it known that we, JOHNSON B. WELCH and CALEB W. WHEATLEY, citizens of the United States, residing at Stockport, in the county of Van Buren, State of Iowa, have invented a new and useful Fishing Device, of which the following is a specification.

This invention relates to fishing apparatus, and has for its principal object to provide a novel form of float which may be employed for deep water fishing while the fisherman stands or walks along the shore of a stream, the float being so constructed and arranged that it will be carried out from the shore by the action of the stream or by the walking of the fisherman along the bank, or both, and the device is equally applicable for fishing from a boat or float, the float being so constructed as to carry the line outward to any desired distance.

A further object of the invention is to provide a line carrying float which may be adjusted in accordance with the strength of the current or the distance to which the float is to travel outward from the shore, and further, to provide for the adjustment of the line connections, so as to alter the speed at which the float travels and the degree of pulling strain exercised on the line.

A still further object of the invention is to provide a float of this type in which the connections are so arranged that when a fish is caught, the line supporting bracket will be disconnected so that the float may turn over on one side to permit its being drawn back by the fisherman in a direct line.

With these and other objects in view, as will more fully hereinafter appear the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of a fishing device constructed in accordance with the invention. Fig. 2 is a similar view looking from the opposite side. Fig. 3 is a plan view showing the manner in which the float is operated upon by the current and the resistance of the line. Fig. 4 is a longitudinal median section through the device. Fig. 5 is a view showing the ineffective position of the device.

Similar numerals of reference are employed to indicate corresponding parts throughout the several figures of the drawings.

The float 10 is hollow or is of any suitable material of a specific gravity less than that of water and preferably is in the form of a plate of wood in the form of an ellipse having flattened ends. One face 11 is preferably flat, or slightly concaved, and the opposite face 12 is convex, the float tapering in thickness from the center toward each of the vertical edges, and these edges being comparatively sharp, so as to offer but little resistance to the passage of the float through the water. In vertical section, the float tapers in thickness from a thin lower edge gradually increasing in thickness toward the top, in order to increase the buoyancy at the upper portion of the disk, while the upper edge of the flattened face 10 is rounded, so that when the disk is turned flatwise on top of the water, it may be pulled shoreward on the surface without any tendency to dip.

On the outer face of the float is secured a line guiding eye 15 arranged in the vertical center of the outer face and near the upper edge of the float. Below, and in alinement with the eye 15, is a resilient arm 16, carrying a second eye 17 that depends below the bottom edge of the float, and which may be turned with the connecting point of the arm as a fulcrum in order to shift the position of the eye to one or other side of the vertical center of the float, and when so adjusted, the arm may be held in place by a loop 18 that is secured to the upper face of the float, as shown in Fig. 2.

On the flat or inner face of the float is secured a bar 20 that extends in a vertical line parallel with the face of the float, this bar being preferably formed of a strip of wire having its ends turned inward and passing through openings formed in the float, one end of the wire being continued to form the arm 16 and the eye 17, while the opposite end of the wire is turned to form the arm holding loop 18.

Secured to the flat face of the float at a point some distance below the upper edge thereof is a horizontal bar 22 that is formed of a piece of wire, the ends of which are turned inward and pass through openings in the float, the extreme ends of the wires being turned down and permanently secured in place, as indicated in Fig. 2. This bar is arranged to receive a slidable bracket 23 that is preferably formed of a piece of wire centrally bent to form two arms 24, the ends of the wire being turned to form eyes 25 that embrace the bar 22, so that the bracket may be moved in the direction of the length of the bar being frictionally held in the desired position by the pressure of the eyes on the rod. One end of the wire which forms the guiding eye 15 is extended through an opening in the float and forms a pivot eye 27, that is arranged to receive an eye 28 formed at the end of a V-shaped arm 29, the lower arm of which forms a bracing member and the opposite end of the arm is turned to form a spring coil 30 which may be sprung over the bar 20 and adjusted in a vertical direction along the length of the bar for the purpose of altering the vertical height of a line guiding eye 31, that is arranged at the outer end or apex of the arm. The bar 20 and eye 27 being both arranged in the same vertical plane, the arm may be swung laterally from side to side, so as to be presented in varying angular positions with relation to the rear or flat face of the float. The upper member of the adjustable arm 29 is provided with an eye 32 through which the outer portion of the bracket 24 extends, so that the bracket will act to lock or hold the arm in adjusted position, the adjustable arm, the bracket and the bar 22 forming an approximately triangular brace that will tend to hold the arm in any angular position to which it may have been adjusted.

The fishing line x is passed through the eye 31; thence over the top of the float, and through the eyes 15 and 17 and to the line is attached a weight or sinker y and one or more hooks z.

The weight or sinker acts in the usual manner to carry the hook down toward the bed of the body of water, while the sinker acts, also, as a means for maintaining the float in upright position.

When the float is placed in the water while the fisherman stands on the bank, the arm 29 is adjusted at such angle to the face of the float as may be necessary to secure the outward travel of the float under the influence of the current, or the walking of the fisherman along the stream, the fishing line being utilized as a towing means so that the float will be deflected outward from the shore and permit fishing in deep water. The angle of the arm may be readily changed to suit varying conditions of current strengths and the distance to which the float is to move outward from the shore, and in some of these positions it will be necessary to adjust the position of the lower guiding eye 17 in order to alter the point at which the weight of the sinker is imposed, and this may be readily accomplished by simply swinging the arm 16 and locking the same frictionally in place by means of the loop 18. It is to be noted that the reason for this adjustment is to permit the arm 16 to at all times lie on the upstream side of the float.

When a fish bites, the jerk on the line will cause, through the resistance of inertia of the float, the spring loop 30 to be drawn out of engagement with the bar 20. The arm 31 will then cause the float to assume a position edgewise to the direction of the fisherman and it may be drawn straight in toward the shore without offering any great resistance to such action.

It is obvious that the towing connections may be modified in very many ways for the purpose of changing the angular pull of the float and secure the desired outward travel of the float.

We claim:—

1. In fishing apparatus, a substantially disk shaped float, a line connecting arm, a means for holding the said arm in adjusted position in a horizontal plane, and a catch for detachably holding the arm in a vertical plane.

2. In fishing apparatus, a substantially disk shaped float, a line connecting arm mounted for varying angular relations to said float in intersecting planes, means for holding said arm in fixed angular relation to the float in one plane and releasable means for holding said arm in fixed angular relation to said float in a second plane.

3. In fishing apparatus, a substantially disk shaped float, a fishing line, and means for connecting the fishing line to the float to permit the use of the line for towing purposes comprising an arm having pivotal connection with said float for the movement of the latter from normal position at approximately right angles to said arm to ineffective position substantially in line with said arm.

4. In fishing apparatus, a substantially disk shaped float, an arm pivotally connected to the float and provided with a guiding eye, a fishing line passing through said guiding eye and over the float, and a weight carried by the line and attached adjacent one edge of the float to maintain the float in effective position upright in the water.

5. In fishing apparatus, a substantially disk shaped float, a line guiding arm, a fishing line guided by the arm and extending over the float, a weight carried by the line and serving to maintain the float in upright position, said arm having a bracing member detachably connected with the float, the connection being separable under strain exerted from the weighted end of the line to thereby permit the float to assume an edgewise position to the direction of the strain.

6. In combination, a substantially disk shaped float, a pivotally mounted arm carried by the float, and provided with a guiding eye, a fishing line passing through the eye, auxiliary guiding eyes carried by the float and arranged to frictionally hold the line, and a weight carried by the line and tending to hold the float in upright position.

7. In combination, a substantially disk-shaped float, a pair of bars secured to one side of said float and arranged at an angle to each other, an arm comprising two angularly disposed members, one pivoted to the float, said arm having a line guiding eye at its apex, a spring coil arranged at the free end of the other member of said arm and adapted to engage with one of the bars, a bracket slidably mounted on the second bar and having a loose pivotal connection with the arm, said bracket serving to hold the arm in required angular relation in a horizontal plane to said float, a pair of friction line guiding eyes arranged at the opposite side of the float, one of said eyes being adjustable in the direction of the length of the float, and a combined fishing and towing line provided with a weight that tends to maintain the float in effective vertical position in the water.

8. In combination, a substantially disk shaped float, a combined fishing and towing line, a weight arranged on the line and tending to maintain the float in effective position vertically in the water, means effecting connection between said float and said line, an arm having a bracing member, means for releasing the bracing member of said arm to permit the float to assume an edgewise position in the water actuated by a relatively sudden pull on said line.

In testimony that we claim the foregoing as our own, we have hereto affixed our signatures in the presence of two witnesses.

JOHNSON B. WELCH.
CALEB W. WHEATLEY.

Witnesses:
J. C. SILVER,
E. C. DOWTHY.